United States Patent [19]
De Rosier et al.

[11] Patent Number: 4,791,840
[45] Date of Patent: Dec. 20, 1988

[54] METAL CUTTING WITH HIGH PRESSURE COOLANT

[75] Inventors: William M. De Rosier, Enfield, Conn.; Frederick D. Parker, Springfield, Mass.

[73] Assignee: United Technologies Corporation, Hartford, Conn.

[21] Appl. No.: 584,675

[22] Filed: Feb. 29, 1984

[51] Int. Cl.4 ............................................... B23B 3/00
[52] U.S. Cl. ......................................... 82/1 C; 407/11
[58] Field of Search ........................... 82/1 C; 407/11

[56] References Cited

U.S. PATENT DOCUMENTS

| 160,161 | 2/1975 | Clay | 407/11 |
|---|---|---|---|
| 522,588 | 7/1894 | Chouteau | |
| 1,695,955 | 12/1928 | Frayer | 407/11 |
| 2,524,232 | 10/1950 | Onsrud | 29/106 |
| 2,653,517 | 9/1953 | Pigott | 407/11 |
| 2,683,303 | 7/1954 | Pigott | 29/106 |
| 2,744,451 | 5/1956 | Lee | 90/33 |
| 2,848,790 | 8/1958 | McMann | 407/11 |
| 3,002,410 | 10/1961 | Lee | 407/11 |
| 3,176,330 | 4/1965 | Jennings | 407/11 |
| 3,362,268 | 1/1968 | Fried | 82/DIG. 3 |
| 4,302,135 | 11/1981 | Lillie | 407/11 |

FOREIGN PATENT DOCUMENTS

| 22293 | 1/1981 | European Pat. Off. | 82/1 C |
|---|---|---|---|
| 3004166 | 8/1980 | Fed. Rep. of Germany | 407/11 |

OTHER PUBLICATIONS

"Machining Titanium with Coolants", *American Machinist* May 24, 1954 pp. 155–159.

Primary Examiner—Frederick R. Schmidt
Assistant Examiner—Lawrence Cruz
Attorney, Agent, or Firm—C. G. Nessler

[57] ABSTRACT

Liquid coolant is directed across the rake surface of a tool bit while machining a material which tends to form a continuous chip. The pressure and volume are sufficient to impact the chip and break it up into small fragments. Pressures of 1400 kPa (200 psi) and higher are used while machining titanium and nickel alloys.

4 Claims, 2 Drawing Sheets

METAL CUTTING WITH HIGH PRESSURE COOLANT

TECHNICAL FIELD

The present invention relates to machining, most particularly the way in which coolant is applied to the vicinity of a cutting tool.

BACKGROUND

The present invention is principally concerned with the machining of metals using single point cutting tools. With such tools, as with most metal cutting in general, a coolant is applied to the vicinity where the cutting takes place in order to improve tool life and enhance the quality of the surface finish. Generally, the coolant also has lubricating properties; a combination of water soluble oil and water is often favored because of cost and good heat transfer characteristics. In certain instances mineral oils and other coolants are utilized.

The dynamics of what occurs at the interface between the edge of the cutting tool and the workpiece have been extensively investigated, according to the literature. This is attributable to the significant economic impact which can result from improvements in cutting tools and cutting methods. In recent years, a major development has been the prolongation of tool life by the use of sintered metal carbides instead of hardened alloy steels. But carbide tools still degrade with time and it is of great interest that this be lessened. Benefits which accrue from extending tool life are much greater than the replacement cost of the tool. They include the avoidance of down time, cost of recalibrating the tool location, and avoidance of possible damage to the workpiece which can occur when a tool breaks unexpectedly.

In machining generally, the chip which is cut from the workpiece strikes the rake surface of the cutting tool and thereby both causes mechanical wear and transfers heat to the cutting tool. Damage to this surface and the cutting edge itself will ultimately cause the tool to break away, unless the tool is preventively replaced. Thus, it has been logically sensed that the tool cutting edge and the top surface of the tool where the chip strikes are the regions most in need of coolant. Therefore, earlier inventors took steps to specifically direct the coolant to such a location, as is shown for instance in U.S. Pat. No. 2,744,451 to Lee.

Generally, such "flood coolant" systems are most often used even today. Coolant is circulated by low pressure pumps, with outputs of the order of 70-105 kPa. In flood cooling it is only required to draw the coolant from the machine sump, lift it to a certain height above the tool and to then generally discharge it in the vicinity of the workpiece and cutter. Of course, the coolant which lands on the workpiece or cutter, whichever may be moving, is thrown about. Shields are used to contain the coolant which flies from the vicinity of the cut. Generally, it has been undesired to add to this spray of coolant by having excess pressure at the point of discharge of the coolant. Thus, the circulating pumps used in applying coolant have been low pressure pumps and high coolant discharge nozzle pressures have been avoided. In fact, "mist cooling", comprising the use of a stream of air and water droplets, is commonly used in less severe situations.

Even as long as 90 years ago it was recognized that there could be certain improvements in the manner in which the coolant is delivered to the vicinity of the tool cutting edge. For example, Chouteau in U.S. Pat. No. 522,588 shows coolant directed along channels in the rake surface of a tool bit. More recently, Pigott in U.S. Pat. No. 2,683,303 shows how coolant is directed from a manifold directly transverse to the cutting face of a milling cutter. Onsrud in U.S. Pat. No. 2,524,232 shows coolant delivered to the cutting face of a cutter by means of channels drilled in the body of the cutter, which channels discharge fluid immediately ahead of the cutting face. Jennings in U.S. Pat. No. 3,176,330 shows a carbide insert held in place by a chip breaker which has channels in it. The coolant is supplied to the chip breaker and discharges through the channels toward the cutting face.

While the foregoing art is representative of certain efforts which have been made, the aforementioned inventions have not been widely utilized. Most probably there are several reasons for this, including that insufficient improvement has been realized from them, that it is undesirable to cut channels in the surface of a cutter and that it is inconvenient to deliver coolant to nozzles that have to be mechanically integrated with the cutting tool. It has been simply both easier and sufficient to use a flood coolant procedure.

In the making of the present invention, low pressure coolant was initially directed specially at the cutting face of the tool, more or less along the lines taught by the Jennings patent. However, using this procedure only gave a certain inadequate tool life in the machining grooves on the outside diameter of titanium and nickel alloy cylinders. Both significant wear and premature breakage were encountered. To increase tool life further research was undertaken, and as a result the invention was made.

DISCLOSURE OF THE INVENTION

An object of the invention is to improve the machining of difficult workpiece materials an configurations to reduce tool bit wear, and to avoid tool bit breakage especially in the machining of undercut grooves.

According to the invention a high pressure and flow of liquid coolant is discharged from port onto the rake surface of a tool bit. The coolant flows toward the cutting edge with great force and causes the chip being machined from the workpiece to fracture into small pieces. When an undercut groove is being machined this alleviates a tendency of the ductile chip to gather and pack in the groove, thereby causing breakage, a cause which we discovered in the course of our work.

The pressure and flow are critical and must be rather high to accomplish the desired result. When machining an undercut groove in a titanium alloy, wear was reduced initially as the pressure was raised above 690 kPa and beyond that ordinarily utilized in flood cooling. But, still there was produced a continuous chip which packed in the groove and caused tool bit breakage. When the pressure was further increased to 1400 kPa and above, the chip was continuously fractured and the problem of tool breakage was alleviated. When machining a stronger nickel base alloy even higher pressures of the order of 2200 kPa were required. Aqueous base coolants are preferred because of their high mass, low viscosity, and general utility.

The foregoing and other objects, features and advantages of the present invention will become more apparent from the following description of the preferred embodiments and accompanying drawings.

BEST MODE FOR CARRYING OUT THE INVENTION

The invention is described in terms of machining the commercial titanium alloy known as AMS 4928 (by weight percent 6 Al, 4V, balance Ti), wherein an undercut shape circumferential groove is machined on the outside diameter of a cylindrical structure, such as a compressor rotor for a gas turbine engine. As discussed below, the machining of such a configuration presents substantial problems. However, it will be appreciated from the description that the invention will be useful for machining other part configurations and other materials.

Figure 1:
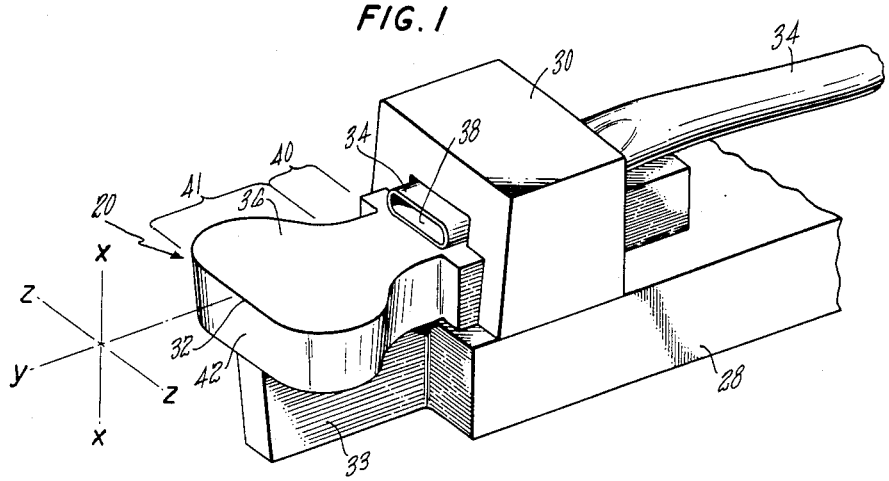
FIG. 1 shows generally a tool configuration used in the practice of the invention.
Figure 2:
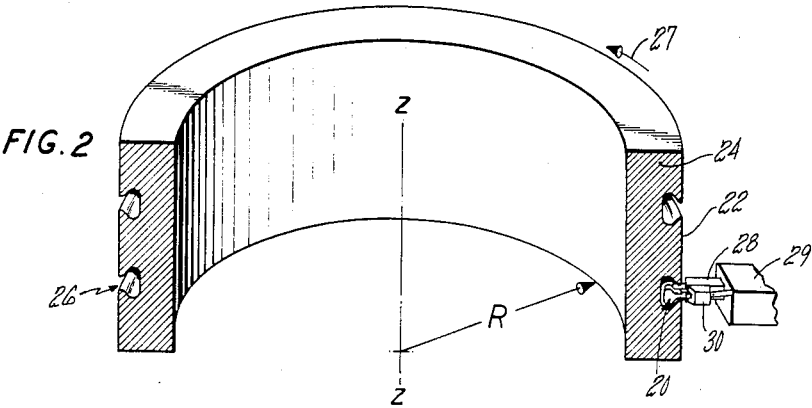
FIG. 2 show how an undercut groove is machined on the outside circumference of a cylindrical workpiece in the practice of the invention.
Figure 4:
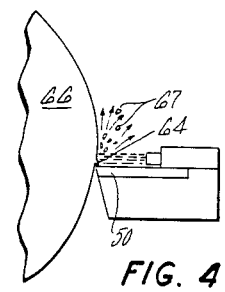
FIG. 4 shows in end view how a cylindrical workpiece is machined at its outer diameter surface by a single point tool in the practice of the invention.

FIG. 1 shows a tool bit 20 in a holder 28 while FIG. 2 shows how the same tool bit is used to machine a groove 26 on the outside diameter 22 of a cylinder 24 (shown in partial cross section) having a radius R. In FIG. 2 the tool bit is shown within the virtually finished undercut groove 26. The tool bit is held in a holder 28 which in turn is mounted in the cross slide 29 of a vertical turret lathe (not shown) which lathe rotates the part in the direction indicated by the arrow 27. FIG. 4 shows a conventional tool bit 50 with which the invention is more simply applied for the removal of material from the circumference of another cylinder 66.

Referring to FIG. 1 again, a C-4 grade carbide tool bit 20 is held on a tool holder 28 by a clamp 30 (the conventional fastening details for which are not shown in the Figure). The holder has a support part 33 extending under the tool bit. The intersection of the relief surface 42 and the rake surface 36 form the arcuate cutting edge 32 which enables the tool bit to cut in directions comprising 180° about the y-z plane. The tool bit has zero rake angle and about 7° relief angle. A rectangular cross section tube 34 is captured within the clamp 30 and is aimed along the top or rake surface 36 so that liquid issuing from its exit port 38 is aimed toward the portion of the cutting edge 32 which lies directly along the y axis. The tool bit is defined herein as being undercut in that the shank part 40 is substantially narrower in width (z axis dimension) than the portion 41 which defines the cutting edge.

Figure 3:
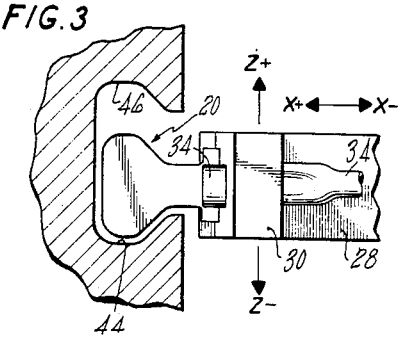
FIG. 3 is a detail view of part of FIG. 2 showing the tool bit within a machined groove just as the groove is finished.

Referring to FIG. 2, and the greater detail of FIG. 3, the circumferential groove 26 is cut in the outside diameter of the cylinder by rotating the cylinder and moving the tool first in the x+ direction at 0.05 mm/revolution to make a radial plunge cut. In all the cuts described herein, the tool bit cutting surface speed is about 2.8 m/s, a speed shown by experience to be optimum for economic material removal. When the desired x axis depth is reached, the tool holder and tool bit are translated in the z+ direction at a relatively low feed rate of 0.013 mm/revolution until the desired axial dimension of the upper side of the groove is achieved. Then the tool is moved in the z− direction at the same feed rate to produce the desired width of groove. Next the tool is restored to its basic z axis entry position, whereupon it is withdrawn in the x− direction.

It will be appreciated that when the tool bit is making the foregoing cuts it is subjected to substantial adverse forces. First, there is a relatively large length of the cutting edge in contact with the workpiece during the plunge; and, second, there is a bending moment due the undercut shape during the side cuts. It is highly undesirable that a tool bit might break within the groove because the groove may thereby be damaged. In aircraft engine components, any such damage requires very special scrutiny to ensure if it is benign. And if it is not benign then the part is rendered useless, a condition with substantial adverse economic consequences.

Before the invention was made, the tool bit described was prone to breakage during the foregoing operations. This breakage was not readily explainable because the feeds were so light. Despite careful attention eight of eleven tool bits were broken during the aforementioned z− motion. Naturally, a flood coolant was used and it was not easy to ascertain what was happening. But then there was discovered in the machining residue small packets of compressed chips. It was deduced that these were accumulating in the region 46 of the undercut groove while the part 44 was being machined. When this occurred the tool bit would jam and break. Naturally, the machining parameters were varied to try to eliminate this problem. However, AMS 4928 titanium, as a ductile material, produced a continuous chip. (By this is meant that the chip did not fracture as it was continuously removed from the workpiece and slid across the rake surface. Of course, ultimately it got to a great length, e.g., 1-3 m or more; whereupon mechanical forces resulting from the chip tangling with other parts of the machine would finally cause it to break.) Usually, a chip breaker on the tool bit would be used under such circumstances. But it will be appreciated that the shape of the tool is such that a chip breaker cannot be readily placed on the tool. We also tried packing the machined portion 46 with rubber, wax and the like, all to no avail.

Before we made our invention cutting was done in the conventional mode and a flood coolant was used. In this procedure a coolant such as water soluble oil and water, such as one using Hocut 3210 (E.F. Houghton Co.) is directed liberally in the vicinity of the cut by nozzles generally aimed at the point where the cutting takes place. In an effort to obtain more cooling, we mounted a coolant nozzle of about 15 mm² area in the manner shown in FIGS. 1 and 4, so that the coolant was directed along the length of the tool rake surface. We used a conventional source of pressurized fluid which was actually relatively high in pressure for ordinary use, having an output of about 690 kPa. (All pressures herein are gage pressures measured on a feed line 34 between the pump and the tool bit. The actual nozlle discharge pressure was somewhat lower than indicated.) Although the coolant was directed into the cut we continued to have the aforementioned problem of packing. Naturally cooling was improved as taught by the Jennings Pat. No. 3,176,330 mentioned in the Background. But then we discovered that by raising the pressure to in excess of about 1400 kPa we were able to eliminate the tool bit breakage. The force and volume of the coolant was causing the continuous chip to fracture. And the amount of wear was substantially reduced. Our experiments were insufficient to get an exact series of quantitative data but the effect was dramatic and verifiable.

Figure 5:
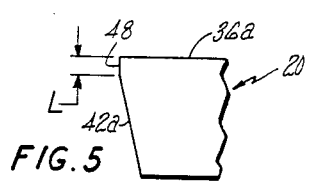
FIG. 5 shows how the wear chamfer at the cutting edge is characterized and measured.

Wear on the tool bit was evidenced primarily by degradation in the sharpness of the cutting edge; there was less significant cratering of the rake surface as well. FIG. 5 shows how a chamfer 48 of length L is produced at the cutting edge, i.e., at the intersection of the relief surface 42a and the rake surface 36a. This parameter was measured on tool bits which did not fracture and become lost in the chip debris.

Figure 6:
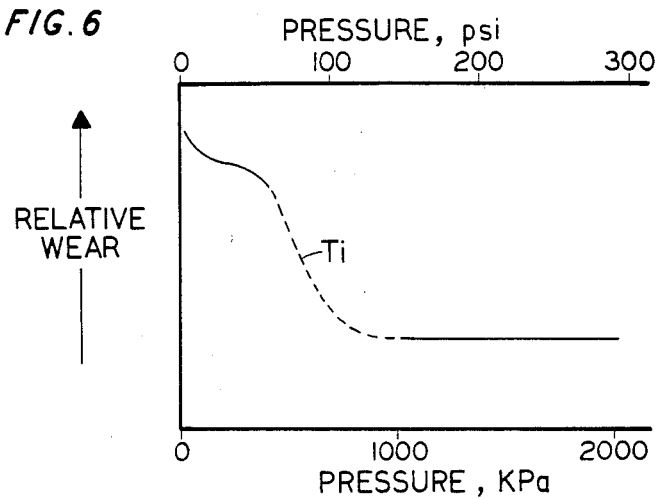
FIG. 6 shows how wear of the cutting edge of a tool bit is relatively improved by increased coolant pressure and resultant flow, using a tool like that shown in FIG. 1.
Figure 7:
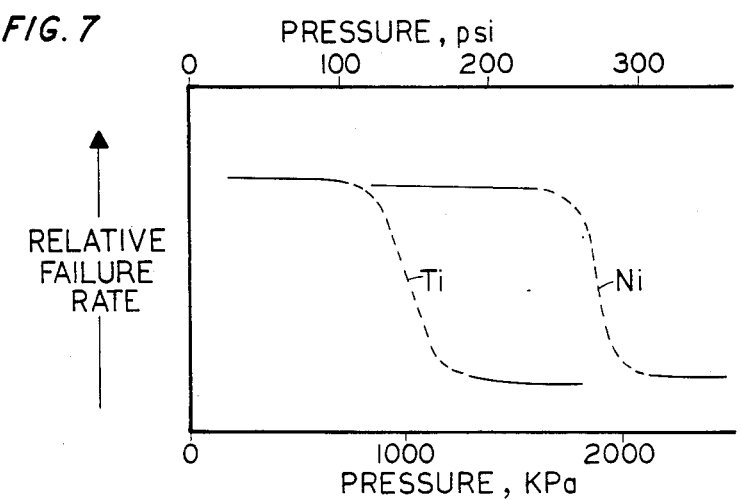
FIG. 7 is analogous to FIG. 6 and shows how tool failure rate due to packing of chips within a groove is reduced when pressure is increased sufficiently.

The FIGS. 6 and 7 show in relative terms the results which we obtained. FIG. 6 shows that as coolant pressure (and of course the resultant flow) was increased the wear of the tool bit decreased. For example, the dimension L dropped from 0.18 mm to 0.05 mm when cutting a groove. This is attributable to expectable phenomenon, as described in the Jennings patent and elsewhere. Cooling and intimate lubrication of the tool bit prolongs its life, especially for titanium alloys. But reference to FIG. 7 shows that failure rate was still high when this result was first obtained. (Failure was evidenced by breakage and was due to chip packing, as we now know.) But when pressure was increased substantially beyond that needed to obtain the reduced wear, tool failure rate was substantially decreased. In fact 27 workpieces were machined with the same parameters referred to above, without tool bit failure. A pressure of about 1400 kPa was sufficient for titanium and even higher pressures did not give any further improvement. Data for the commercial IN-100 type nickel superalloy are also shown. This alloy also produces a continuous chip, but it is substantially stronger. (AMS 4928 has a room temperature ultimate tensile strength of about 1000 MPa and 13-15% elongation while modified IN-100 has about 1400 MPa strength and 12-15% elongation. But AMS 4928 has even lower relative high temperature strength since IN-100 is a superalloy designed for high temperature strength and it is not. The exact temperature of the chip is uncertain but it is most likely above 600° C. and may be as much as 1000° C. at the point of cutting.) When the same type of undercut groove was being machined (with a C-9 carbide at a lower surface cutting speed of about 1.3 m/s) substantially higher pressure of the order of 2250 kPa was needed to obtain chip breakage and avoid packing of modified IN-100 in the groove.

Examination of the chip debris showed that when the pressure reduced failure rate the continuous chip was converted to a discontinuous chip of 3-12 mm length. Not only was chip packing reduced but wear also was reduced, both as evidenced by the chamfer 48 and a reduced tendency for rake surface cratering.

As shown in FIG. 1 the coolant was directed along the y axis of the tool. Therefore, during the plunge cut it directly impacts on the chips as they are formed and start to slide across the rake surface. But, when the tool cuts in the z axis direction the coolant does not directly impact the chips. However, owing to the configuration of the groove and volume and pressure of the coolant, there is deflection of the coolant sufficient to break up the chip by secondary impact, we believe. Thus, in the simpler configuration of single point outside circumferential cutting shown in FIG. 4, somewhat lower pressure and volume may be effective to convert the continuous chip 64 into the discontinuous chips 64. While packing will not be a problem in such a circumstance, there will be benefits nonetheless in reduced cratering, chip disposal, and possibly reduced cutting edge wear.

Naturally, other shapes of ports beyond the rectangular port 38 shown in FIG. 1 may be used and multiple ports may be used as well. Such an arrangement would be appropriate with tool bits which are operating in unconfined environments and which are cutting for more than a short distance along the cutting edge.

The coolant flows associated with the pressure recited herein were of the order of 0.6-0.7 1/s. The general size of the undercut tool bit we refer to herein was that the cutting edge part 41 had a z axis width of about 7.3 mm while the shank part 40 had a width of about 2.5 mm. The coolant we used was of the aqueous type and this type is preferred because of high specific gravity and low viscosity, compared for instance to oils. It is the momentum of the liquid stream which causes the fracturing of the chip. Since momentum is a function of the mass flow rate and the velocity of the coolant, it is dependent on the density of the coolant (the velocity of course being a function of the discharge pressure). Therefore, if higher density coolants are used it will be possible to use lower pressures within the practice of our invention. Also, we used a relatively simple nozzle and it is conceivable that better nozzle design might enable reduction in applied pressure. The materials we machined are ductile and it is to such materials with their tendency to form continuous chips in normal machining that the invention is principally useful. Of course if weaker materials are machined than those we refer to, lower applied pressures could be needed to carry out the invention. Conversely, if stronger materials or greater feed rates (with resultant thicker chips) were encountered, higher pressures could be required. Lastly, while we describe the invention in terms of lathe turning, the principles will be applicable to other metal cutting operations where a tool bit is used.

Although this invention has been shown and described with respect to a preferred embodiment, it will be understood by those skilled in the art that various changes in form and detail thereof may be made without departing from the spirit and scope of the claimed invention.

We claim:

1. The method of turning an undercut groove in a metal workpiece with a cutting tool bit having an undercut shank and a cutting edge formed by the intersection of a rake surface and a relief surface wherein the material tends to be removed by the toll bit moving relative to the workpiece with a first continuous chip length when an ordinary flood coolant process is used, characterized by directing a flow of liquid coolant substantially parallel to the rake surface of the tool bit and into the groove toward the vicinity of the cutting edge, to impact the material being removed; wherein the coolant has a pressure greater than 690 kPa (100 psig) and a volume sufficient to cause the material being removed to fracture into material pieces having a second chip length shorter than the first chip length, to thereby prevent chips from packing in the groove.

2. The method of claim 1 wherein the workpiece is made of a nickel superalloy.

3. The method of claim 1 wherein the coolant is an aqueous base coolant.

4. The method of claim 1 wherein the tool bit has an arcuate cutting edge.

* * * * *